(12) United States Patent
Fontana et al.

(10) Patent No.: US 6,549,428 B1
(45) Date of Patent: Apr. 15, 2003

(54) DEVICE FOR SUPPORTING AND FIXING BUS-BARS

(75) Inventors: Rodolfo Fontana, Clivio (IT); Alessandro Leone, Seregno (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 09/830,302

(22) PCT Filed: Oct. 25, 1999

(86) PCT No.: PCT/EP99/08155

§ 371 (c)(1),
(2), (4) Date: Jun. 25, 2001

(87) PCT Pub. No.: WO00/27008

PCT Pub. Date: May 11, 2000

(30) Foreign Application Priority Data

Oct. 30, 1998 (IT) .......................................... MI98A2346
May 6, 1999 (IT) .......................................... MI99A0993

(51) Int. Cl.⁷ .................................................. H02B 1/01
(52) U.S. Cl. ........................ 361/825; 361/801; 361/802; 361/809; 361/810; 439/212; 439/213; 174/71 B; 174/72 B
(58) Field of Search ................................ 361/825, 771, 361/801, 802, 809, 832, 675, 740, 759, 775; 439/212, 213; 174/71 B, 72 B, 70 B, 88 B, 99 B, 129 B, 133 B, 149 B, 68.2

(56) References Cited

U.S. PATENT DOCUMENTS

| | | | | |
|---|---|---|---|---|
| 4,419,715 A | * | 12/1983 | Pear ........................ | 174/133 B |
| 5,847,321 A | * | 12/1998 | Carle et al. ............. | 174/149 B |
| 5,854,445 A | * | 12/1998 | Graham et al. ......... | 174/133 B |

FOREIGN PATENT DOCUMENTS

EP       A-0 681 355       11/1995

* cited by examiner

*Primary Examiner*—David Martin
*Assistant Examiner*—Hung Bui
(74) *Attorney, Agent, or Firm*—Guido Modiano; Albert Josif; Daniel O'Byrne

(57) ABSTRACT

A device for supporting and fixing bus-bars in cabinets for switchboards, comprising:

a first element, constituted by a body made of insulating material, which has a first side provided with means for direct engagement to a supporting frame and a second side provided with a plurality of first seats for coupling to corresponding bus-bars;

a second element, constituted by a body made of insulating material which has a shaped side along which a plurality of second seats are provided for coupling to the bus-bars, the first and second elements being mutually connected in order to geometrically couple the first and second seats and to clamp the bus-bars inside the seats.

51 Claims, 12 Drawing Sheets

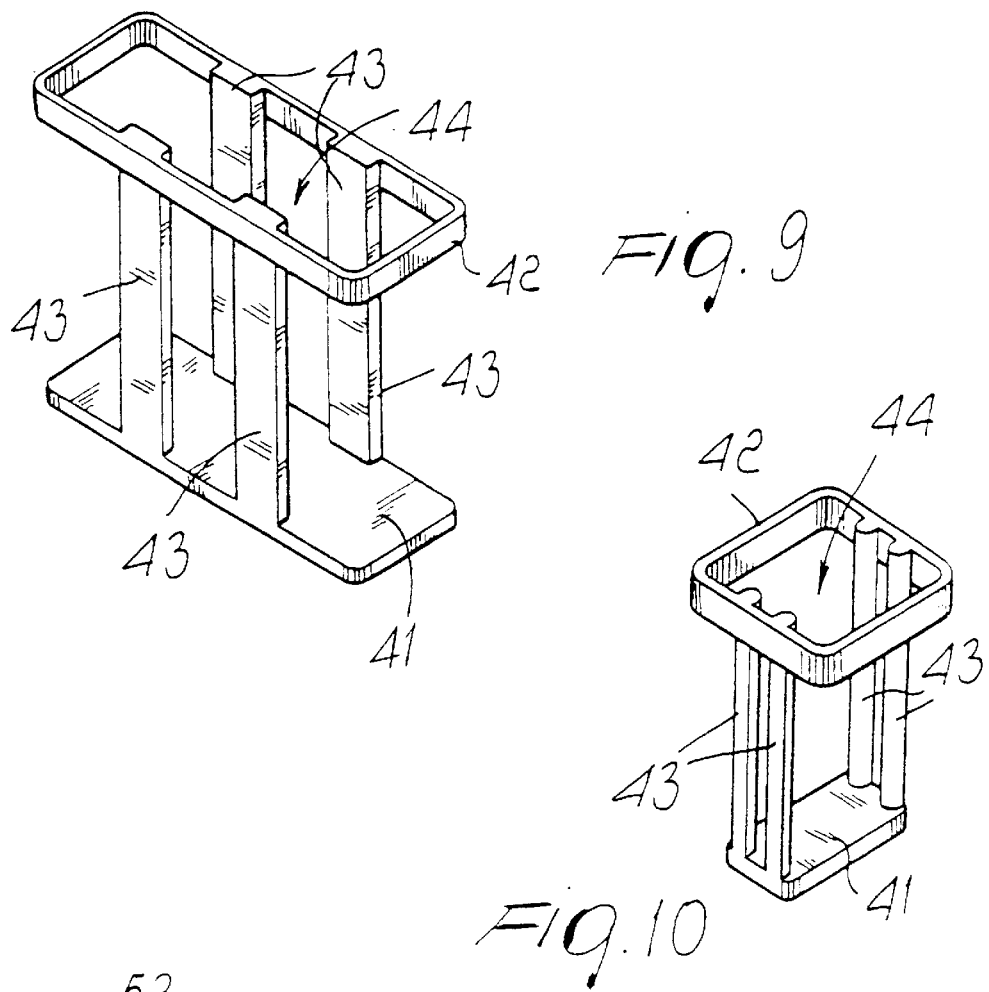
FIG. 9
FIG. 10
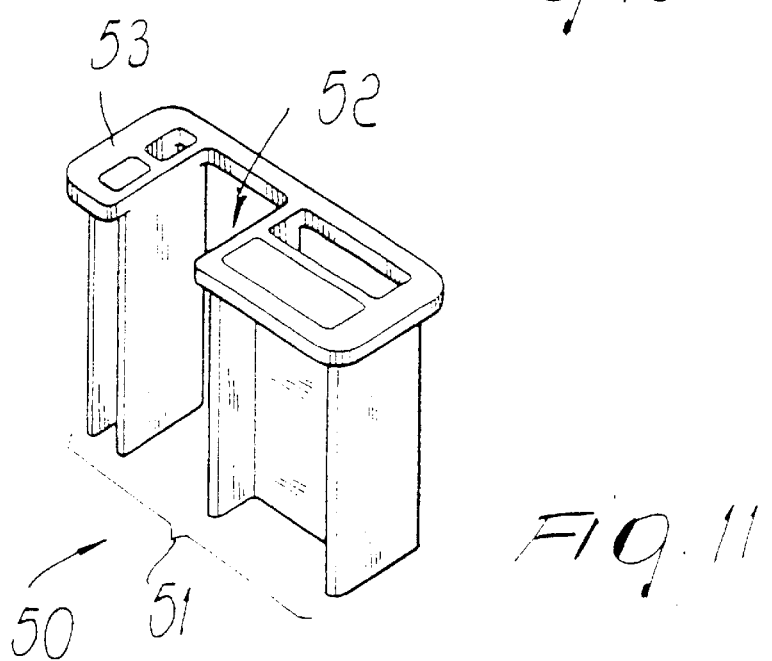
FIG. 11

DEVICE FOR SUPPORTING AND FIXING BUS-BARS

BACKGROUND OF THE INVENTION

The present invention relates to a device for supporting and fixing bus-bars in cabinets for switchboards and the like which has improved functions and characteristics.

More particularly, the device according to the invention has a structure which is unique in its simplicity both from the point of view of production and from the point of view of practical use, allowing to reduce the components required and therefore the production costs, to facilitate assembly and to optimize the bus-bar support and insulation functions.

It is known that switchboards for distributing electric power to a plurality of electrical devices, such as for example circuit breakers, use a system of mutually parallel metal bus-bars.

Each one of said bus-bars is connected to a corresponding pole of the electric power supply mains; the connection between the bus-bars and the devices is provided by means of suitable conductors, for example laminae, which are shaped appropriately according to the type of device.

Inside the cabinets of the switchboards, the bus-bars are geometrically coupled to suitable insulation and support devices which, in addition to electrically insulating the bus-bars with respect to each other, allow to connect them to a supporting structure, typically the frame of the cabinet. In this manner, any electrodynamic stresses produced by the flow of current in the bus-bars are further discharged onto the structure of the cabinet, which is stronger.

In the current state of the art, using conventional insulation and support devices entails drawbacks.

In practical applications it is known to use insulation and support devices which are constituted by a main insulating body which comprises at least two appropriately shaped parts which geometrically couple to the bus-bars, insulating them from each other, and are further mutually connected by means of fixing systems, such as for example screws etcetera. The bus-bars are further connected to the supporting frame by using additional components which are fixed to the main insulating body and to the supporting structure.

This solution is clearly disadvantageous, since it requires the use of a plurality of constructive components and has a distinct separation between the parts for coupling and insulating the bus-bars and those for fixing to the supporting structure; this leads to structural complexity, with a consequent increase in production times and costs and in the time and difficulties entailed by assembly.

Another typical drawback of conventional devices is poor flexibility in use according to the position of the bus-bars to be supported. Inside the cabinets, owing to application requirements, the bus-bars are in fact arranged with a substantially vertical or horizontal axis, in a line or staggered with respect to each other; in these situations, conventional solutions generally provide for the use of a plurality of devices which have a different shape according to the position of the bus-bars, consequently increasing production costs.

Another drawback of conventional devices is the fact that when the bus-bars are arranged vertically it is necessary to use a base supporting element constituted by a shaped insulating body which couples to the bus-bars and is in turn fixed to a base plate according to a solution which is structurally complicated and expensive.

SUMMARY OF THE INVENTION

The aim of the present invention is to provide a device for supporting and fixing bus-bars in cabinets for switchboards and the like which can be provided by means of a reduced number of components, allowing to reduce production costs and at the same time optimize the bus-bar support and insulation functions.

Within the scope of this aim, an object of the present invention is to provide a device for supporting and fixing bus-bars in cabinets for switchboards whose structure allows to couple it to horizontally and vertically arranged bus-bars, distinguishing from the conventional devices in that it provides greater flexibility of use.

Another object of the present invention is to provide a device for supporting and fixing bus-bars in cabinets for switchboards which allows to facilitate assembly and connection to the bus-bars and fixing to the supporting structure, thus reducing its installation times.

Another object of the present invention is to provide a device for supporting and fixing bus-bars in cabinets for switchboards which is highly reliable, relatively easy to manufacture and at competitive costs.

This aim, these objects and others which will become apparent hereinafter are achieved by a device for supporting and fixing bus-bars in cabinets for switchboards, characterized in that it comprises:

a first element, constituted by a body made of insulating material, which has a first side provided with means for direct engagement to a supporting frame and a second side provided with a plurality of first seats for coupling to corresponding bus-bars;

a second element, constituted by a body made of insulating material which has a shaped side along which a plurality of second seats are provided for coupling to said bus-bars, said first and second elements being mutually connected in order to geometrically couple said first and second seats and to clamp the bus-bars inside the seats.

The device according to the invention has the considerable advantage of integrating in one of its components the means for engaging the supporting structure; in this manner the components to be used are reduced and the assembly operations are simplified.

BRIEF DESCRIPTION OF THE DRAWINGS

Further characteristics and advantages of the present invention will become apparent from the following detailed description of preferred but not exclusive embodiments of the device according to the invention, illustrated only by way of non-limitative example in the accompanying drawings, wherein:

FIGS. 9 and 10 are perspective views of two possible embodiments of a stop module which can be used in the device according to the invention;

FIG. 11 is a perspective view of an adapter module which can be used in the device according to the invention;

In the following description, identical reference numerals designate identical or technically equivalent elements.

DESCRIPTION OF THE PREFERRED EMBODIMENTS

Figure 5:
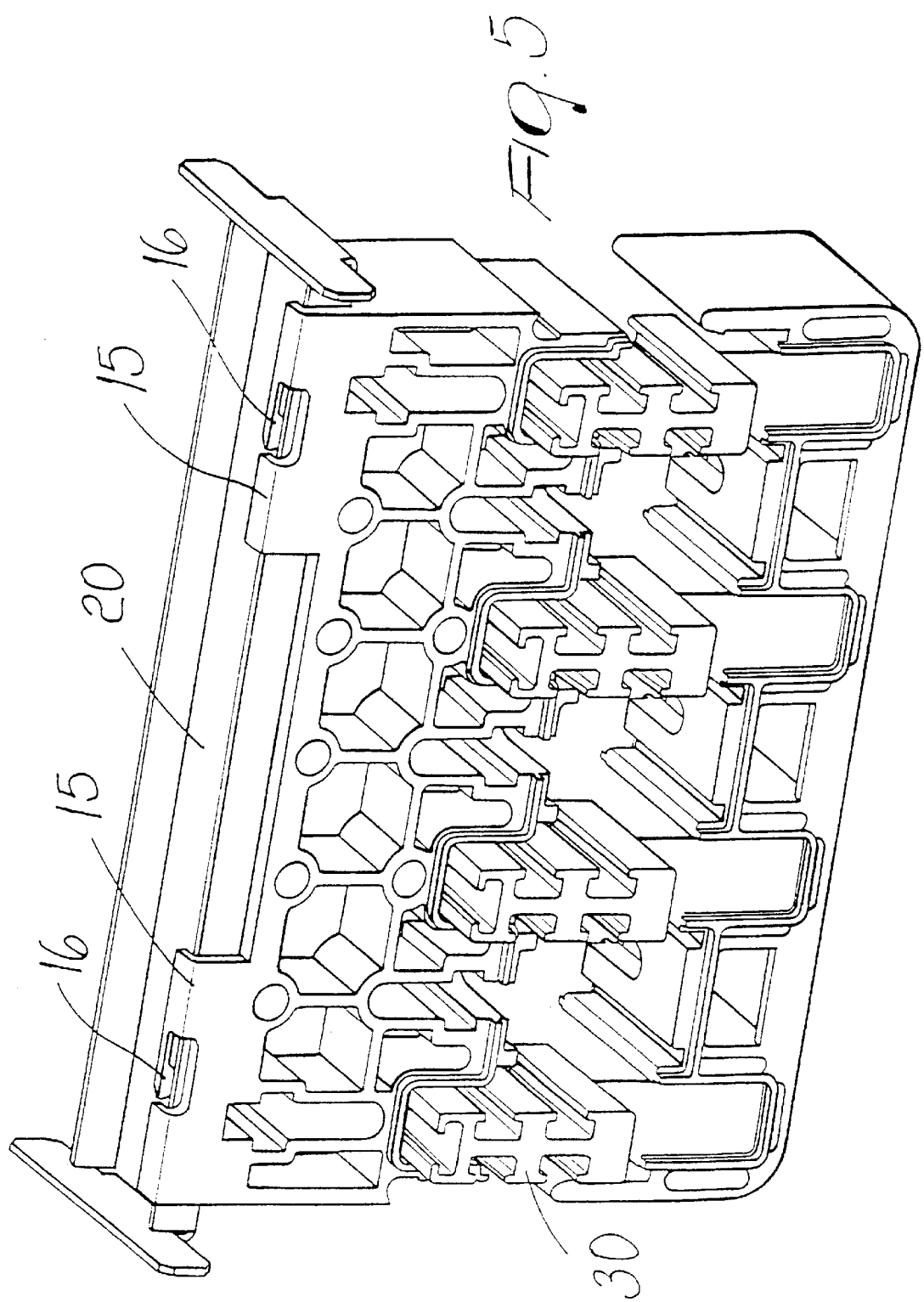
FIG. 5 is a perspective view of the two elements shown in FIGS. 1 and 2 during coupling to a system of bus-bars.
Figure 6:
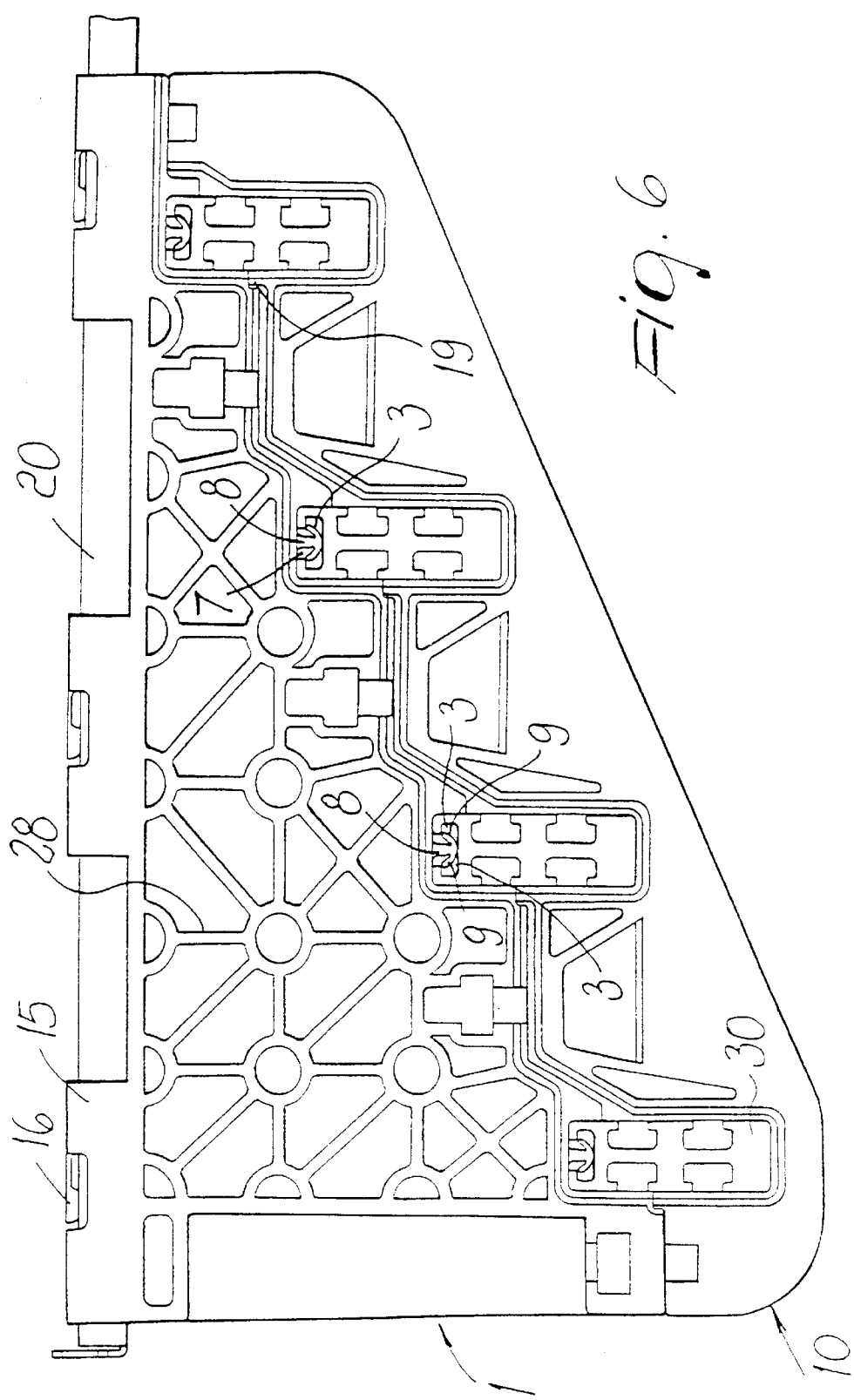
FIG. 6 is a top plan view of the two elements shown in FIGS. 3 and 4, coupled to a system of bus-bars.

With reference to the above figures, the supporting and fixing device according to the invention comprises two elements, designated by the reference numerals 1 and 10 respectively, both of which are made of insulating material, for example thermoplastic or thermosetting material. As shown in detail in FIGS. 1 and 3, a first insulating element 1 has, along a first shaped side 4, means 5 for direct engagement with a supporting frame. As shown in FIGS. 5 and 6, the illustrated supporting element is constituted by a cross-member 20 of a cabinet of an electrical switchboard. In the illustrated embodiment, the cross-member 20 has a C-shaped profile; clearly, the supporting element to which the device is to be connected and the shape of its profile may be any, so long as it is compatible with the application; for example, it would be possible to use U-shaped, L-shaped or other similar profiles.

Figure 1:
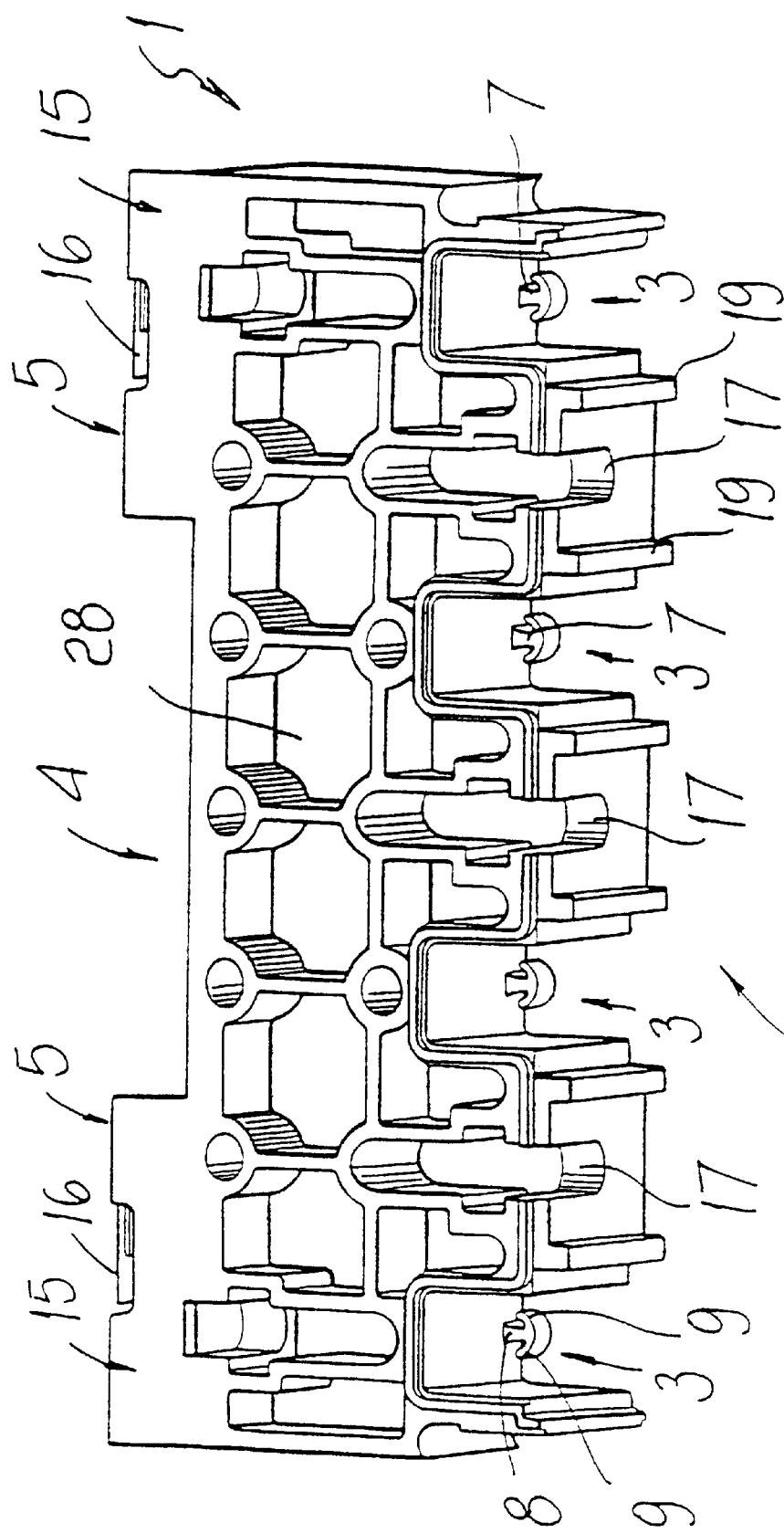
FIGS. 1 and 2 are perspective views of a first embodiment of a pair of elements used in the device according to the invention.
Figure 3:
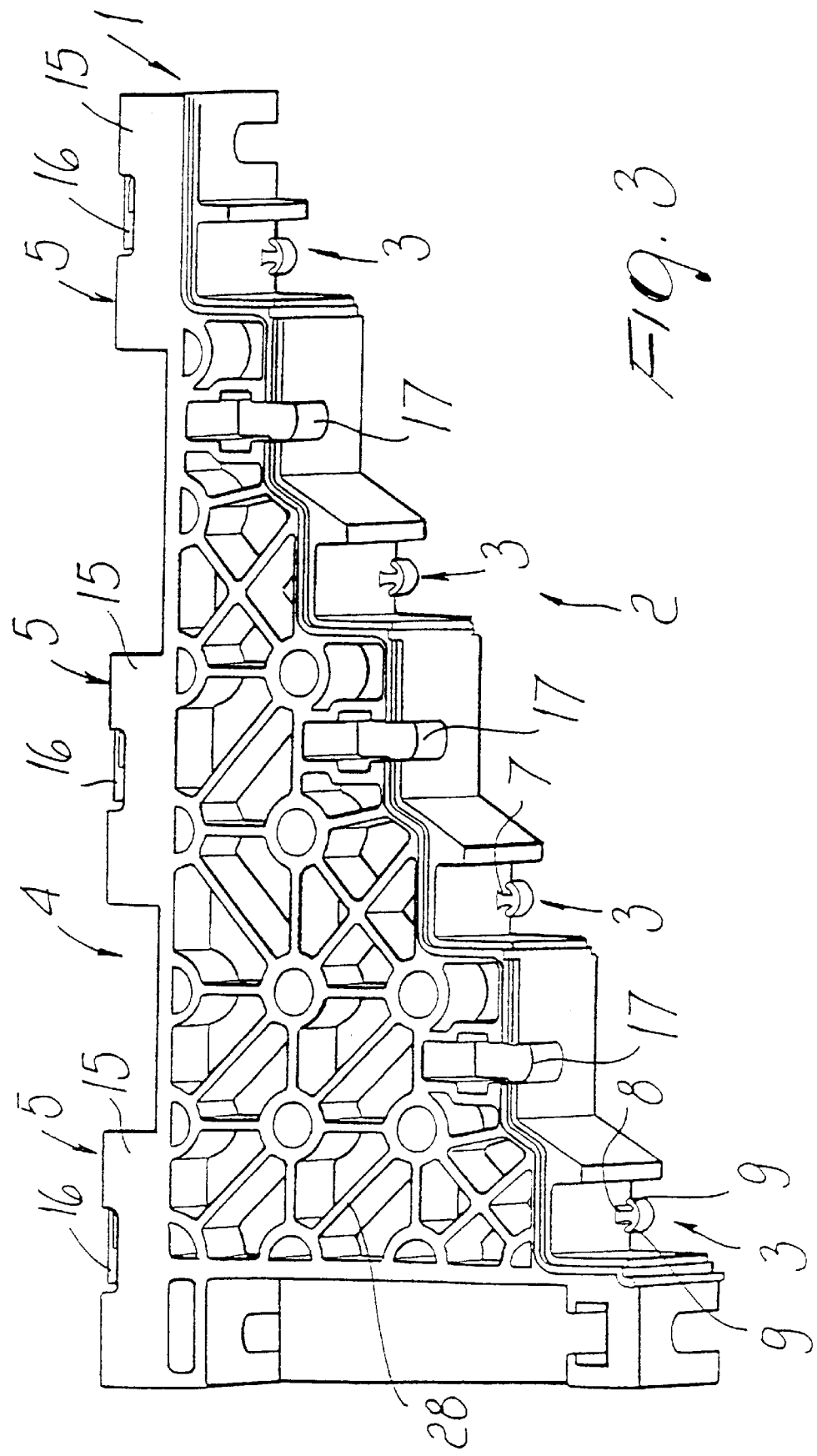
FIGS. 3 and 4 are perspective views of a second embodiment of a pair of elements used in the device according to the invention.

The engagement means 5 comprise wings 15 which have an L-shaped cross-section and geometrically couple to the corresponding walls of the frame 20. In particular, as shown in FIG. 1, the insulating element 1 has two wings which are located near the ends of the side 4. The number of the wings and their arrangement along the side 4 can vary in any case according to the different applications; thus, for example, in a fully equivalent way, it would be possible to use a single wing or three wings as shown in FIG. 3 or more than three wings.

The wings 15 further have, in a substantially median portion, a shaped portion which forms flexible hooks 16 which abut against the walls of the frame 20; the hooks 16 allow to connect the device to the frame and facilitate its sliding along said frame.

In this way the first insulating element 1, by means of the wings 15 and the hooks 16, has the advantage that it can be fixed directly to the supporting frame without using additional components and according to a constructive solution which is extremely simple and effective and allows to reduce production costs and to considerably simplify the assembly operations.

The first insulating element 1 has, along a second side 2, a plurality of seats 3 for coupling to corresponding bus-bars 30, as shown in FIGS. 5 and 6; the shape and the dimensions of the illustrated bus-bars 30 is clearly to be considered merely as an example. As shown in detail in FIGS. 1 and 3, a protrusion 7 is formed on the surface of the coupling seats 3 and has a crossbow-shaped profile which is adapted for coupling to a slot of a bus-bar 30. In particular, the protrusion 7 has a central body 8 which protrudes from the end wall of the seats 3 and from which two wings 9 protrude which have a free end which is not connected to the central body 8. In this way, when the bus-bars are inserted in the corresponding seats 3, the protrusion 7 enters a slot of the bus-bars; during insertion, the wings 9, by means of the interaction with the side walls of the slot, are first compressed toward the body 8 and then open out again, coupling to the rear part of said walls. In this way, the protrusion 7 has a spring-like behavior which allows an extremely simple snap-together coupling between the bus-bar and the seat 3 which facilitates the assembly operations.

Obviously, the protrusion 7 can be differently shaped in accordance with specific needs or different applications.

A further advantage of the device according to the invention is the fact that along the walls of the side 2 there are a plurality of slots 17 which have a U-shaped profile and are interleaved with the seats 3; moreover, in a particularly preferred embodiment, shown in FIG. 1, the element 1 has centering teeth 19 in a substantially symmetrical position with respect to the slots 17. The centering teeth 19 and the slots 17 are suitable to facilitate respectively the mutual centering of the two elements 1 and 10 and their mutual fixing, in the manner described in greater detail hereinafter.

Finally, the body of the element 1 has a central region 28 whose structure is a grid of stiffening ribs which allow to reduce the amount of material used while providing the necessary structural rigidity.

Figure 2:
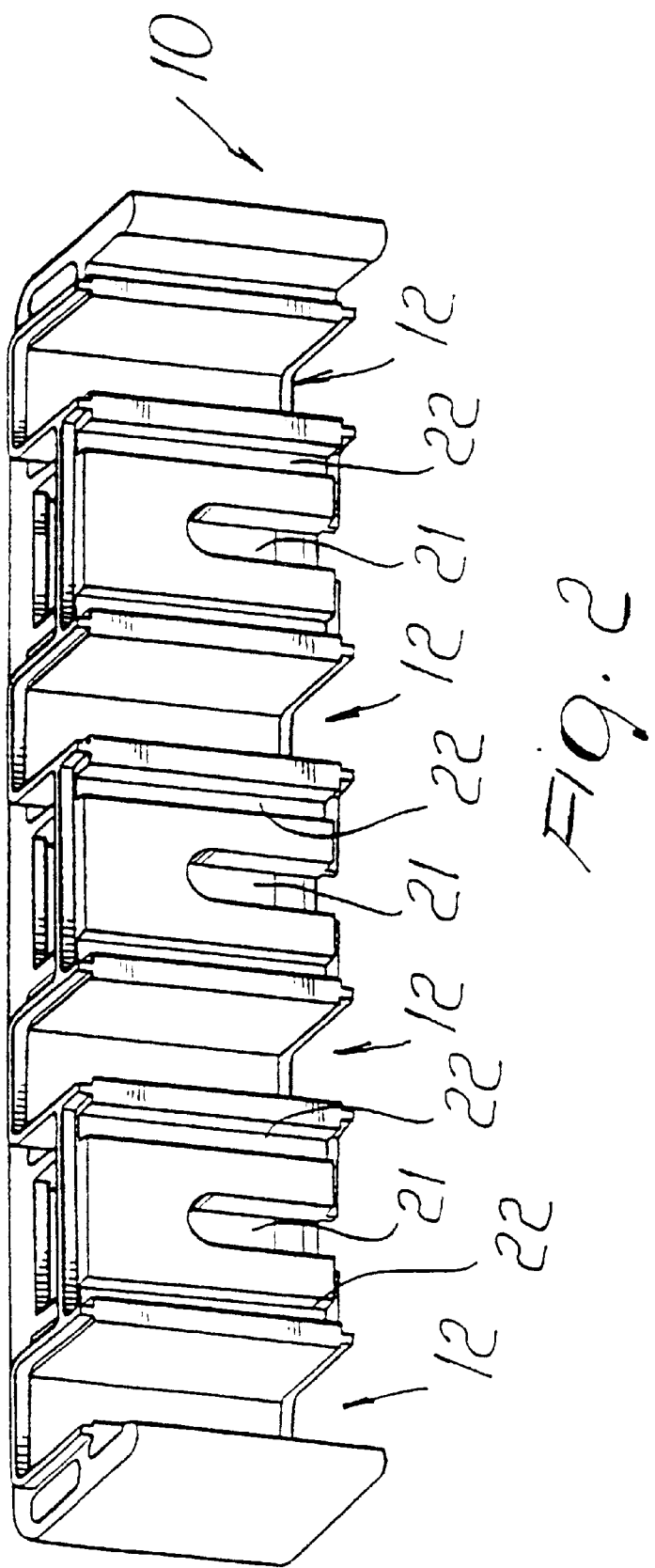
Figure 4:
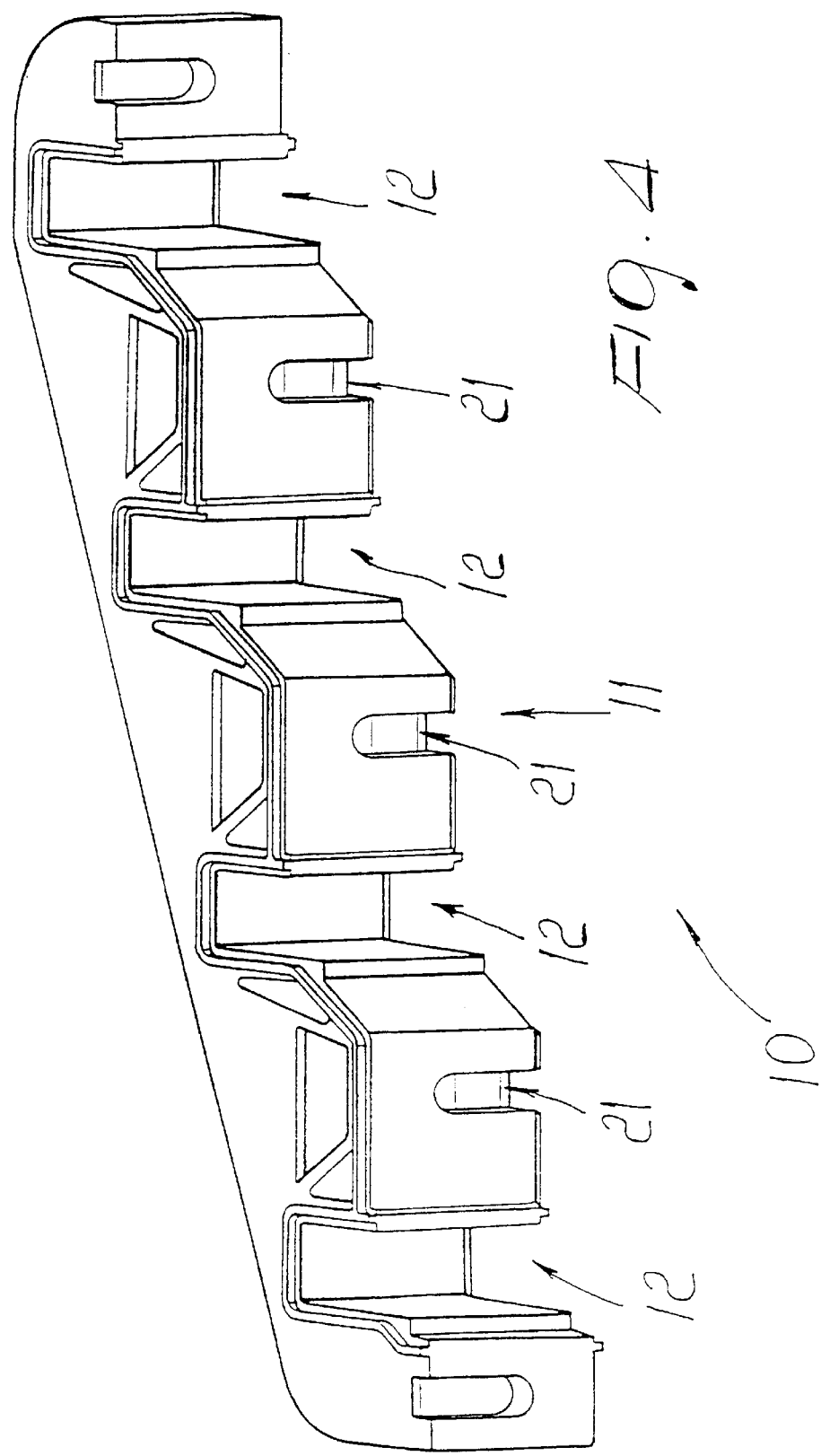

As shown in FIGS. 2 and 4, the second insulating element 10 has a shaped side 11 along which there are a plurality of seats 12 for coupling to bus-bars; the width of the seats is substantially equal to the width of the seats 3. Along the side 11 a plurality of slots 21 are provided which have a U-shaped profile, are interleaved with the seats 12 and correspond to the slots 17 of the element 1; as shown in FIG. 2, in a preferred embodiment of the device according to the invention the second insulating element 10 has, in a substantially symmetrical position with respect to the slots 21, tracks 22 which are suitable to accommodate the centering teeth 19. The tracks 22 and the teeth 19 can of course also be formed respectively in the elements 10 and 1 shown in FIGS. 4 and 3.

In practice, during assembly the element 1 is engaged by means of the wings 15 and the hooks 16 to the supporting frame 20, for example a cross-member of the cabinet; as described earlier, the shape of the wings 15 and of the hooks 16 is such that an operator can easily slide the element 1 along the cross-member so as to place it in the position that best suits the assembly requirements. Once the element 1 has been positioned correctly, it is fixed by means of fixing means, such as screws, by using suitable holes, not shown in the figures, which are generally provided at the end of the element 1 or of the element 10. Then the bus-bars 30 are inserted in the seats 3; in this way, the slots of the bus-bars engage the protrusions 7 with a snap-together action; the second element 10 is in turn arranged so as to allow to insert in the seats 12 the portion of the bus-bars that protrudes from the seats 3. The connection between the two elements 1 and 10 is then obtained by inserting fixing means, such as screws and nuts, in the U-shaped slots; the bus-bars are locked in this manner. In particular, the embodiments of the device according to the invention allow extreme simplification of the assembly operations; it is in fact possible to insert the fixing nuts manually by slight forcing or by means of an ultrasound technique which allows to simulate welding of the nut to the walls of the elements 1 and/or 10. It is also possible to use co-molding or overmolding techniques by means of which metallic inserts, not shown in the figures, can be first embedded in the walls of the elements to be coupled and then threaded appropriately. Advantageously, in a preferred embodiment of the device according to the invention the U-shaped slots of the two elements have mutually inverted profiles; in this manner, when the two elements 1 and 10 are moved toward each other for connection, the two inverted coupled profiles substantially simulate a hole, preventing the possible fall of the screws and thus facilitating the fixing operations.

A further advantage of the device according to the invention is the fact that if required by the size and conducting capacity of the bus-bars it is possible to insert suitable insulating adapter modules 50 in the seats 12; one possible embodiment of an adapter module 50 is shown in FIG. 11. In particular, the adapter module 50 has a body which is substantially shaped like a parallelepiped and is made of thermoplastic or thermosetting material, optionally reinforced with glass fibers; a seat 52 is formed along one side 51 of said body, is suitable to accommodate a corresponding bus-bar 30, and its geometric dimensions can be chosen according to the conductive capacity, i.e., the dimensions, of the bar that it will accommodate. The adapter module 50 further has an end surface which is shaped so as to perimetrically form a protruding edge 53.

Figure 12:
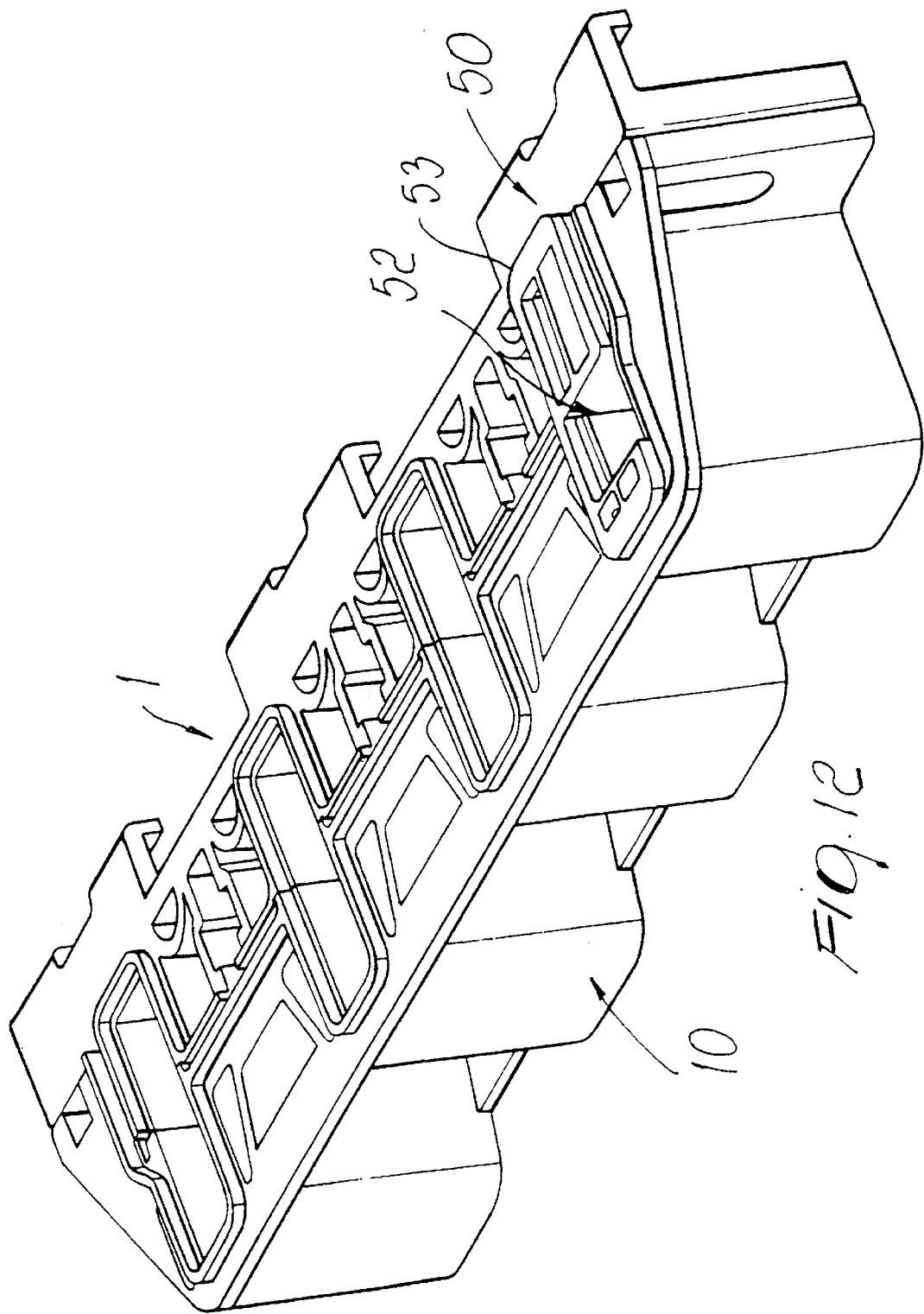
FIG. 12 is a view of the adapter module of FIG. 11, coupled to two insulating elements used in the device according to the invention.

The use of an adapter module 50 thus conceived is particularly useful in practical application because, though being extremely simple to use, it allows high flexibility in practical applications. During assembly, the adapter module 50 is in fact simply inserted in the coupling seats formed by the two mutually connected elements 1 and 10; in turn, the protruding edge 53 couples geometrically to the supporting surface formed by the elements 1 and 10, as shown for example in FIG. 12. In this manner it is possible to easily change the electrical configuration and the performance of the cabinet in which the device according to the invention is used. For example, it is possible to provide an electrical switchboard in which the insulating elements 1 and 10 have geometric dimensions suitable to accommodate bus-bars which conduct currents at 1600 A; by using modules 50 inside the coupling seats, capable of giving the greatest assurances of reliability and safety in use, it is also possible, if demanded by practical requirements, to use bars which conduct for example currents at 800 A (or even less) and are therefore smaller than the 1600 A bars, without thereby entailing significant structural changes or complications in the assembly of the switchboard. A further advantage of the device according to the invention is the fact that it allows the coupling and support of bus-bars arranged in an aligned configuration, as shown in FIG. 5, or in a staggered configuration, as shown in FIG. 6, horizontally or vertically, thus avoiding the adoption of parts having mutually different shapes and being functionally applicable with any configuration of the switchboard.

Figure 7:
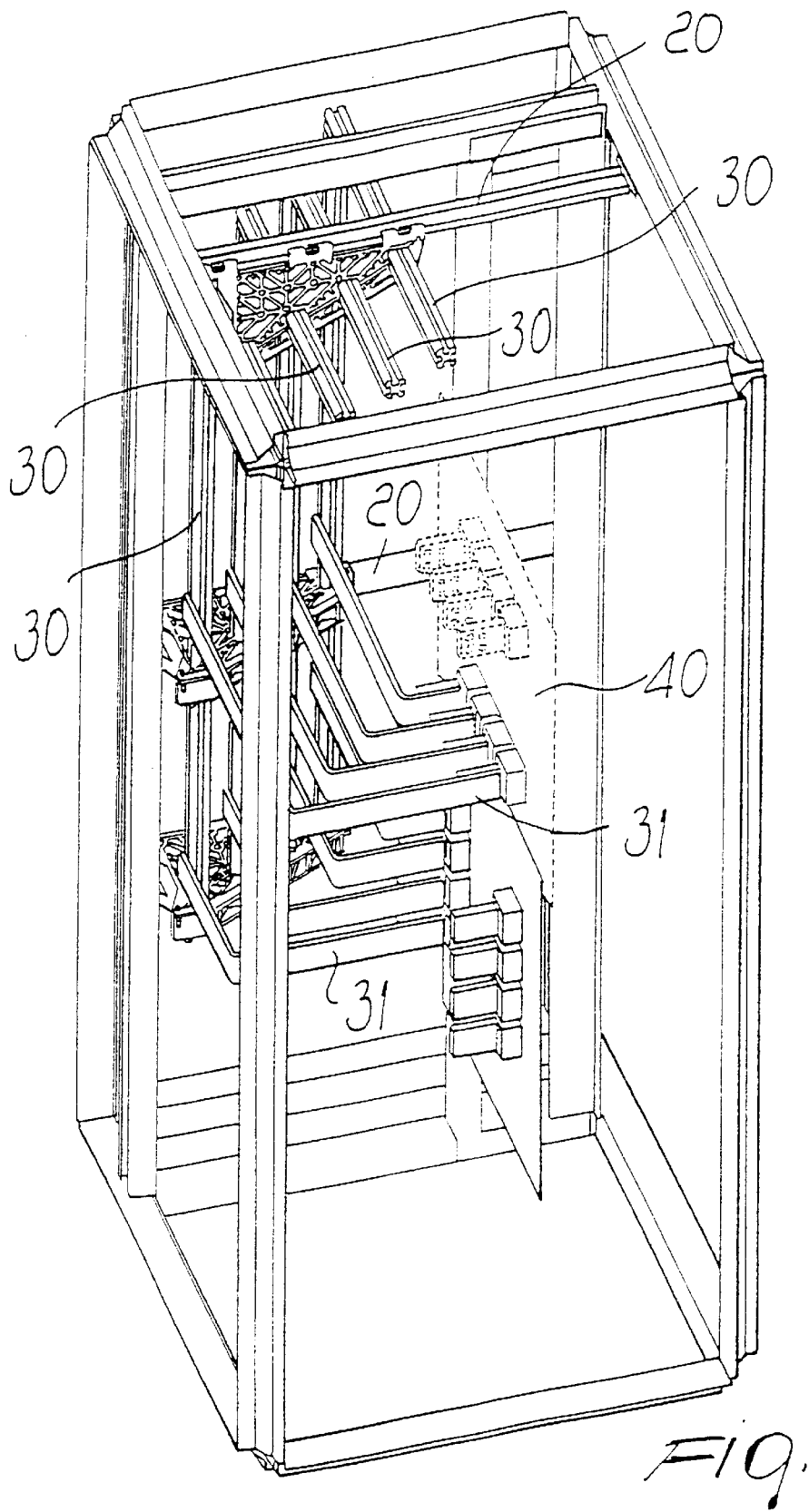
FIG. 7 is a view of a plurality of insulators used for supporting and insulating bus-bars in a cabinet of a switchboard according to another embodiment.

In this regard, an example of possible application of the device according to is the invention is shown in FIG. 7, which illustrates three devices coupled to bus-bars 30 of a four-pole system. As shown in the figure, two devices are fixed to the frame of the cabinet in a substantially horizontal position and support bus-bars which have a vertical axis, while a third device is coupled to the upper part of the frame and supports horizontally-arranged bus-bars. The bus-bars are then connected to an electrical device, schematically designated by the reference numeral 40, by means of flat bus-bars 31.

Figure 8:
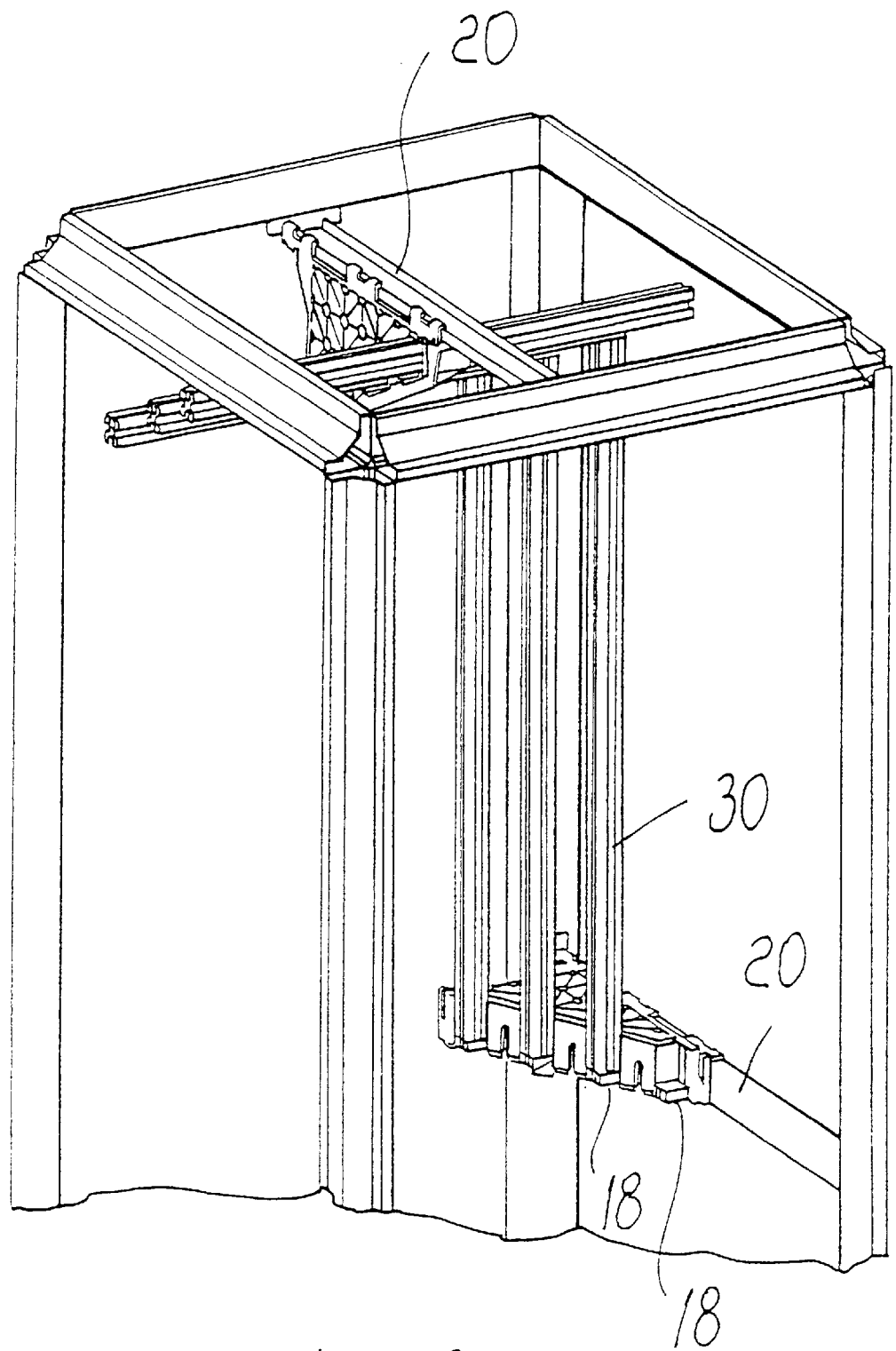
FIG. 8 is a schematic view of two insulators used to support and insulate is bus-bars according to another embodiment.

A further advantage is given by the fact that, as shown in FIG. 8, in the case of vertically-arranged bus-bars for which a base support is required the device according to the invention comprises stop modules 18 which can be inserted in said coupling seats so as to act as base support, stop and insulation elements for said bars. The stop modules 18 are made of insulating material, preferably thermoplastic or thermosetting material optionally reinforced with glass fibers in order to give the module the necessary structural rigidity associated with suitable elasticity.

Preferred embodiments of the stop modules 18 are shown in FIGS. 9 and 10. In particular, each stop module 18 has a substantially rectangular base 41, a collar 42 which is spaced from the base 41 and is arranged on a plane which is substantially parallel thereto, and a plurality of ribs 43 which are shaped substantially like a parallelepiped, run at right angles to the base 41 and connect the collar 42 and said base 41. In this manner the stop module 18 has a basket-like body which forms a recess 44 suitable to accommodate one end of a bus-bar 30.

Figure 13:
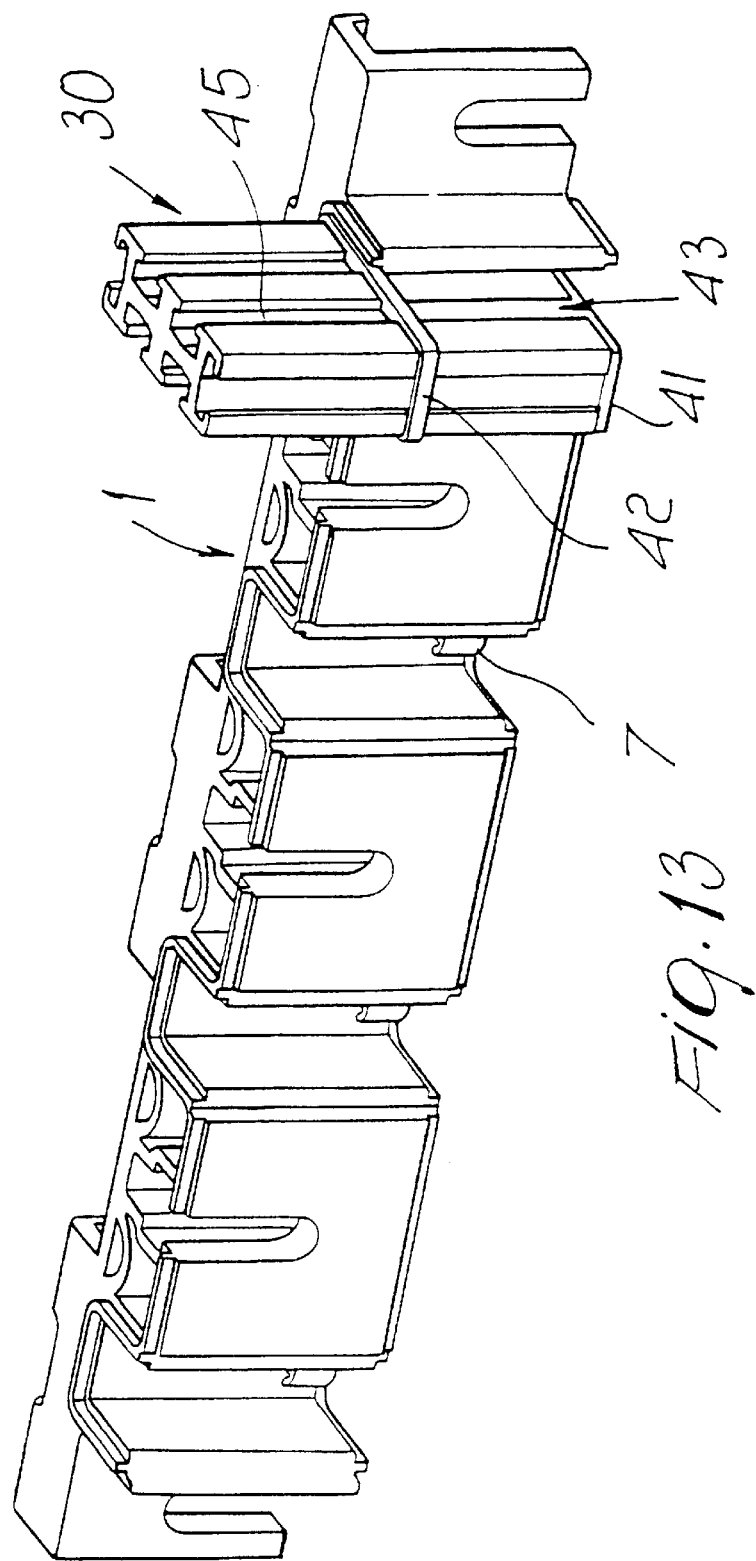
FIG. 13 is a view of the adapter module of FIG. 9, coupled to a bus-bar and inserted in a seat of an insulating element used in the device according to the invention.

As shown in FIG. 13, each stop module 18 is arranged at one end of a bus-bar 30 so that the base 41 mates with the end surface of the bar 30 and the ribs 43 enter corresponding slots 45 formed in the surface of said bar; in the embodiment shown in FIGS. 9 and 10 there are four ribs 43 arranged in pairs on two parallel sides of the stop module 18. In turn, the collar 42 wraps around the outer surface of the bar.

The number, arrangement, and shape of the ribs 43 can obviously vary according to the shape and dimensions of the bus-bars to which they are to couple; likewise, the shape and the dimensions of the base 41 and of the collar 42 can be modified conveniently, so long as the modification is compatible with the applications.

Figure 14:
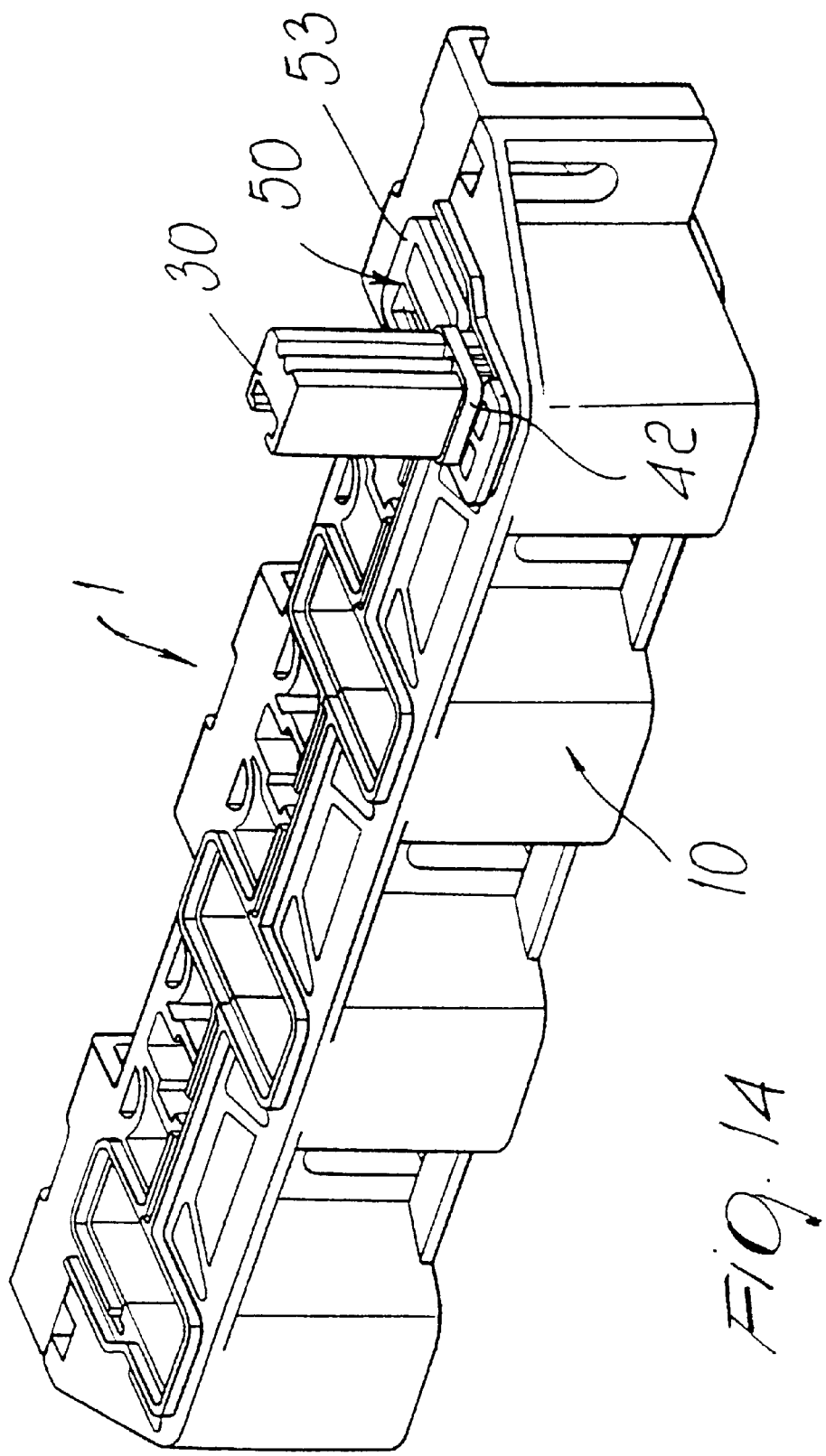
FIG. 14 is a view of the various components that constitute the device according to the invention, coupled to each other and to a bus-bar according to one possible embodiment.

During the assembly of the electrical switchboard, the assembly constituted by the bar and the stop module 18 is inserted in the coupling seat formed by the coupling of the two elements 1 and 10: the base 1 abuts against the protrusion 7 and the collar 42 abuts against the edge of said seat; only the first element 1 is shown in FIG. 13 for the sake of clarity. In this manner, the stop module 18 constitutes a base support which in addition to electrically insulating the lower part of the bus-bar assists the other components of the device in structurally supporting the bus-bar. It is evident that this solution is extremely simple and that by integrating in a single element both the insulation function and the base support function it allows to reduce the number of parts required with respect to conventional devices, allowing in particular to eliminate the use of a dedicated base metal plate. The stop modules 18 are further usable advantageously already during the packaging of the bus-bars; during this step it is in fact possible to use, for each bus-bar 30, two stop modules 18 located at the opposite ends of the bus-bar. In this case, the presence of the collar 42 and of the ribs 43 allows to place the bars side by side and to package them in a single container, protecting the more delicate parts, particularly the end corners, against accidental impacts which might damage them and cause technical problems in operation. Moreover, during the assembly of the switchboard each stop module 18 facilitates the correct centering of the bus-bars in the insulator elements 1 and 10 and provides operators with a useful reference point for starting assembly. Additionally, the stop module 18 can be used together with an adapter module 50, as shown for example in FIG. 14; in this case the collar 42 abuts against the edge 53.

In an alternative embodiment, not shown in the figures, the stop modules 18 can be constituted for example by blocks which are shaped substantially complementarily with respect to the shape of the seats in which they are inserted.

In practice it has been observed that the device according to the invention fully achieves the intended aim and objects; it is also important to note that all the innovative functions and the inventive aspects of the device can be obtained by using commonly commercially available elements and materials with extremely low costs. The two insulating elements 1 and 10, the stop modules 18 and the adapter modules 50 may furthermore each be obtained by means of a single molding operation, thus allowing to simplify the steps of production.

The device thus conceived is susceptible of numerous modifications and variations, all of which are within the scope of the inventive concept; all the details may also be replaced with other technically equivalent elements. In practice, the materials employed, as well as the dimensions, may be any according to requirements and to the state of the art.

What is claimed is:

1. A device for supporting and fix bus-bars in cabinets for switchboards, comprising:
   a first element, constituted by a body made of insulating material, which has a first side provided with means for direct engagement to a supporting frame and a second side provided with a plurality of first seats for coupling to corresponding bus-bars, wherein a protrusion is formed on the surface of the first seats, said protrusion being shaped for snap-together coupling to a corresponding slot of a bus-bar;
   a second element, constituted by a body made of insulating material which has a shaped side along which a plurality of second seats are provided for coupling to said bus-bars, said first and second elements being mutually connected in order to geometrically couple said first and second seats and to clamp the bus-bars inside the seats.

2. The device according to claim 1, wherein said means for direct engagement to the supporting frame comprise at least one wing which has an L-shaped cross-section.

3. The device according to claim 2, wherein said L-shaped wing has, in a substantially median position, a shaped portion which forms a flexible hook.

4. The device according to claim 1, wherein said protrusion has a crossbow-shaped profile.

5. The device according to claim 1, wherein a plurality of U-shaped slots are formed along the second side of said first element, said slots being substantially interleaved with said first seats.

6. The device according to claim 5, wherein along the second side of said first element and in a substantially symmetrical position with respect to said U-shaped slots, teeth for centering said second element are provided.

7. The device according to claim 1, wherein said first element has a central region provided with a grid of structural stiffening ribs.

8. The device according to claim 1, wherein said second element has, along its shaped side and in a position which is substantially interleaved with the respective second seats, a plurality of U-shaped slots which are suitable to facilitate connection to the first element.

9. The device according to claim 8, wherein the slots of the second element have a U-shaped profile which is inverted with respect to the U-shaped profile of the slots of the first element.

10. The device according to claim 9, wherein along the shaped side of the second element and in a substantially symmetrical position with respect to said U-shaped slots, tracks for coupling to corresponding centering teeth of the first element are provided.

11. The device according to claim 1, comprising a plurality of supporting modules which are made of insulating material and have a recess which is suitable to accommodate an end of a bus-bar, each one of said supporting modules being insertable in one of said coupling seats.

12. The device according to claim 11, wherein said supporting modules have a substantially rectangular base, a collar which is spaced from the base and is arranged on a plane which is substantially parallel thereto, and a plurality of ribs protruding substantially at right angles to the base and mutually connecting the collar and the base.

13. The device according to claim 12, herein the supporting modules comprise four ribs, said ribs being parallelepiped-shaped and arranged in pairs on two parallel sides of the base.

14. The device according to claim 11, wherein the first and second elements, and/or the supporting modules are made of thermoplastic or thermosetting material.

15. The device according to claim 1, further comprising a plurality of adapter modules made of insulating material, each one of said adapter modules being insertable in one of said coupling seats and having a body substantially shaped like a parallelepiped and along one side of which there is a seat which is suitable to accommodate a corresponding bus-bar.

16. The device according to claim 15, wherein said body shaped substantially like a parallelepiped has an end surface which is shaped so as to perimetrically form a protruding edge.

17. The device according to claim 15, wherein said adapter modules are made of thermoplastic or thermosetting material.

18. A device for supporting and fixing bus-bars in cabinets for switchboards, comprising:
   a first element, constituted by a body made of insulating material, which has a first side provided with means for direct engagement to a supporting frame and a second side provided with a plurality of first seats for coupling to corresponding bus-bars;
   a second element, constituted by a body made of insulating material which has a shaped side along which a plurality of second seats are provided for coupling to said bus-bars, said first and second elements being mutually connected in order to geometrically couple said first and second seats and to clamp the bus-bars inside the seats, and further comprising a plurality of supporting modules which are made of insulating material and have a recess which is suitable to accommodate an end of a bus-bar, each one of said supporting modules being insertable in one of said coupling seats.

19. The device according to claim 18, wherein said means for direct engagement to the supporting frame comprise at least one wing which has an L-shaped cross-section.

20. The device according to claim 19, wherein said L-shaped wing has, in a substantially median position, a shaped portion which forms a flexible hook.

21. The device according to claim 18, wherein a protrusion is formed on the surface of the first seats for snap-together coupling to a corresponding slot of a bus-bar.

22. The device according to claim 21, wherein said protrusion has a crossbow-shaped profile.

23. The device according to claim 21, wherein a plurality of U-shaped slots are formed along the second side of said first element, said slots being substantially interleaved with said first seats.

24. The device according to claim 23, wherein along the second side of said first element and in a substantially symmetrical position with respect to said U-shaped slots, teeth for centering said second element are provided.

25. The device according to claim 18, wherein said first element has a central region provided with a grid of structural stiffening ribs.

26. The device according to claim 18, wherein said second element has, along its shaped side and in a position which is substantially interleaved with the respective second seats, a plurality of U-shaped slots which are suitable to facilitate connection to the first element.

27. The device according to claim 26, wherein the slots of the second element have a U-shaped profile which is inverted with respect to the U-shaped profile of the slots of the first element.

28. The device according to claim 27, wherein along the shaped side of the second element and in a substantially symmetrical position with respect to said U-shaped slots, tracks for coupling to corresponding centering teeth of the first element are provided.

29. The device according to claim 18, wherein said supporting modules have a substantially rectangular base, a collar which is spaced from the base and is arranged on a plane which is substantially parallel thereto, and a plurality of ribs protruding substantially at right angles to the base and mutually connecting the collar and the base.

30. The device according to claim 29, wherein the supporting modules comprise four ribs, said ribs being parallelepiped-shaped and arranged in pairs on two parallel sides of the base.

31. The device according to claim 18, further comprising a plurality of adapter modules made of insulating material, each one of said adapter modules being insertable in one of said coupling seats and having a body substantially shaped like a parallelepiped and along one side of which there is a seat which is suitable to accommodate corresponding bus-bar.

32. The device according to claim 31, wherein said body shaped substantially like a parallelepiped has an end surface which is shaped so as to perimetrically form a protruding edge.

33. The device according to claim 18, wherein the first and second elements, and/or the supporting modules are made of thermoplastic or thermosetting material.

34. The device according to claim 18, wherein said adapter modules are made of thermoplastic or thermosetting material.

35. A device for supporting and fixing bus-bars in cabinets for switchboards, comprising:
 a first element, constituted by a body made of insulating material, which has a first side provided with means for direct engagement to a supporting frame and a second side provided with a plurality of first seats for coupling to corresponding bus-bar;
 a second element, constituted by a body made of insulating material which has a shaped side along which a plurality of second seats are provided for coupling to said bus-bars, said first and second elements being mutually connected in order to geometrically couple said first and second seats and to clamp the bus-bars inside the seats, and further comprising a plurality of adapter modules made of insulating material, each one of said adapter modules being insertable in one of said coupling seats and having a body substantially shaped like a parallelepiped and along one side of which there is a seat which is suitable to accommodate a corresponding bus-bar.

36. The device according to claim 35, wherein said means for direct engagement to the supporting frame comprise at least one wing which has an L-shaped cross-section.

37. The device according to claim 36, wherein said L-shaped wing has, in a substantially median position, a shaped portion which forms a flexible hook.

38. The device according to claim 35, wherein a protrusion is formed on the surface of the first seats for snap-together coupling to a corresponding slot of a bus-bar.

39. The device according to claim 38, wherein said protrusion has a crossbow-shaped profile.

40. The device according to claim 38, wherein a plurality of U-shaped slots are formed along the second side of said first element, said slots being substantially interleaved with said first seats.

41. The device according to claim 40, wherein along the second side of said first element and in a substantially symmetrical position with respect to said U-shaped slots, teeth for centering said second element are provided.

42. The device according to claim 35, wherein said first element has a central region provided with a grid of structural stiffening ribs.

43. The device according to claim 35, wherein said second element has, along its shaped side and in a position which is substantially interleaved with the respective second seats, a plurality of U-shaped slots which are suitable to facilitate connection to the first element.

44. The device according to claim 43, wherein the slots of the second element have a U-shaped profile which is inverted with respect to the U-shaped profile of the slots of the first element.

45. The device according to claim 44, wherein along the shaped side of the second element and in a substantially symmetrical position with respect to said U-shaped slots, tracks for coupling to corresponding centering teeth of the first element are provide.

46. The device according to claim 35, comprising a plurality of supporting modules which are made of insulating material and have a recess which is suitable to accommodate an end of a bus-bar, each one of said supporting modules being insertable one of said coupling seats.

47. The device according to claim 46, wherein said supporting modules have a substantially rectangular base, a collar which is spaced from the base and is arranged on a plane which is substantially parallel thereto, and a plurality of ribs protruding substantially at right angles to the base and mutually connecting the collar and the base.

48. The device according to claim 47, wherein the supporting modules comprise four ribs, said ribs being parallelepiped-shaped and arranged in pairs on two parallel sides of the base.

49. The device according to claim 35, wherein said body shaped substantially like a parallelepiped has an end surface which is shaped so as to perimetrically form a protruding edge.

50. The device according to claim 46, wherein the first and second elements, and/or the supporting modules are made of thermoplastic or thermosetting material.

51. The device according to claim 35, wherein said adapter modules are made of thermoplastic or thermosetting material.

* * * * *